US008150869B2

(12) United States Patent
Jamil et al.

(10) Patent No.: US 8,150,869 B2
(45) Date of Patent: Apr. 3, 2012

(54) COMBINED WEB BROWSING AND SEARCHING

(75) Inventors: Faisal R Jamil, Redmond, WA (US); Gunawan Herri, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 12/050,131

(22) Filed: Mar. 17, 2008

(65) Prior Publication Data

US 2009/0234811 A1    Sep. 17, 2009

(51) Int. Cl.
G06F 17/30    (2006.01)

(52) U.S. Cl. .......... 707/768; 707/705; 707/736; 706/11; 706/12; 715/700; 715/800

(58) Field of Classification Search .................. None
See application file for complete search history.

(56) References Cited

U.S. PATENT DOCUMENTS

| 6,121,968 | A  | * | 9/2000 | Arcuri et al. | 715/825 |
|-----------|----|---|---------|---------------|---------|
| 6,232,972 | B1 | * | 5/2001 | Arcuri et al. | 715/815 |
| 6,233,575 | B1 |   | 5/2001 | Agrawal et al. | |
| 6,366,906 | B1 | * | 4/2002 | Hoffman | 1/1 |
| 6,581,039 | B2 |   | 6/2003 | Marpe et al. | |
| 6,581,056 | B1 |   | 6/2003 | Rao | |
| 6,587,835 | B1 | * | 7/2003 | Treyz et al. | 705/14.64 |
| 6,604,108 | B1 | * | 8/2003 | Nitahara | 1/1 |
| 6,647,534 | B1 | * | 11/2003 | Graham | 715/205 |
| 6,728,702 | B1 | * | 4/2004 | Subramaniam et al. | 1/1 |
| 6,978,264 | B2 | * | 12/2005 | Chandrasekar et al. | 1/1 |
| 7,043,535 | B2 | * | 5/2006 | Chi et al. | 709/218 |
| 7,044,365 | B2 | * | 5/2006 | Witherspoon | 235/379 |
| 7,136,845 | B2 |   | 11/2006 | Chandrasekar et al. | |
| 7,184,168 | B2 | * | 2/2007 | Beckman et al. | 358/1.18 |
| 7,647,312 | B2 | * | 1/2010 | Dai | 707/999.004 |
| 7,685,116 | B2 | * | 3/2010 | Pell et al. | 707/999.004 |
| 7,693,912 | B2 | * | 4/2010 | Rose et al. | 707/779 |
| 7,716,236 | B2 | * | 5/2010 | Sidhu et al. | 707/766 |
| 7,970,889 | B2 | * | 6/2011 | Bennett et al. | 709/224 |
| 8,010,523 | B2 | * | 8/2011 | Djabarov | 707/721 |
| 2006/0282416 | A1 | * | 12/2006 | Gross et al. | 707/3 |
| 2007/0150466 | A1 |   | 6/2007 | Brave et al. | |

(Continued)

FOREIGN PATENT DOCUMENTS

GB    WO0146828 A2    6/2001

OTHER PUBLICATIONS

Chris Olston, "Scent Trails: Intergrating Browsing and Searching on the Web", ACM, 2001.*

(Continued)

*Primary Examiner* — Hung Le

(57) ABSTRACT

Context information for a user of a device is identified and is used to identify a set of keywords based at least in part on a current Web page being displayed and one or more previous Web pages displayed for the user. The set of keywords and/or information regarding previous searches are used to identify a set of query terms. The set of query terms are displayed as part of a user interface. Additionally, a user selection of a search preview option can be received while displaying a Web page. In response to receiving the user selection of the search preview option, a user-entered query term is sent to a search engine. Search results based on the query term are received from the search engine, and both the search results and the Web page are displayed concurrently in a same window.

20 Claims, 8 Drawing Sheets

U.S. PATENT DOCUMENTS

| | | | |
|---|---|---|---|
| 2007/0162422 A1* | 7/2007 | Djabarov | 707/2 |
| 2007/0220447 A1 | 9/2007 | Ray | |
| 2007/0226193 A1 | 9/2007 | Todaka | |
| 2008/0028334 A1* | 1/2008 | De Mes | 715/781 |
| 2008/0172630 A1 | 7/2008 | Dang | |
| 2009/0006343 A1 | 1/2009 | Platt | |
| 2009/0144234 A1* | 6/2009 | Sharif et al. | 707/3 |

OTHER PUBLICATIONS

Udi Manber et al, "WebGlimpse—Combining Browsing and Searching", Usenix Technical Conference, 1997.*

Ken Wittenburg et al, "Integration of Browsing, Searching, and Filtering in an Apploet for Web Information Access", Late-Breaking / Short Talks, 1997.*

Yee, et al., "Faceted Metadata for Image Search and Browsing", Proceedings of the SIGCHI Conference on Human Factors in Computing Systems. IEEE, 2006, pp. 8.

"Converging Search and Browse", Impression Media, 2007, pp. 1-3.

Joseph, et al., "Searching Emergent Vocabularies: Exploring Methods to Reduce Cognitive Load during Web Navigation and Resource Contribution", Proceedings of the 39th Annual Hawaii International Conference on System Sciences—vol. 07, HICSS '06, IEEE, 2006, pp. 10.

* cited by examiner

COMBINED WEB BROWSING AND SEARCHING

BACKGROUND

The use of the Internet and World Wide Web (or simply the Web) has become commonplace throughout the world. Information is typically made available to users via Web pages that are retrieved from servers on the Internet and displayed on the users' computers. Two general paradigms are typically followed for users obtaining Web pages. The first paradigm is a search paradigm in which the user enters one or more search terms and a search engine returns a list of Web pages that satisfy those search terms. The second paradigm is a browsing paradigm in which the user selects a link on one Web page that identifies a second Web page and causes the second Web page to be displayed in place of the first Web page. These two paradigms, however, can be difficult for users because users oftentimes are required to switch back and forth between the two paradigms to find relevant information to fulfill their needs. Such switching can be problematic, for example, because users may lose their "search location" when they switch to browsing or lose their "browse location" when they switch to searching.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, context information for a user of a device is identified and is used to identify a set of keywords based at least in part on a current Web page being displayed and one or more previous Web pages displayed for the user. The set of keywords is used to identify a set of query terms, and the identified set of query terms are displayed as part of a user interface of the device.

In accordance with one or more aspects, a user selection of a search preview option is received while a display device is displaying a Web page. In response to receiving the user selection of the search preview option, a user-entered query term is sent to a search engine. Search results based on the query term are received from the search engine, and both the search results and the Web page are displayed concurrently in a same window being displayed by the display device.

BRIEF DESCRIPTION OF THE DRAWINGS

The same numbers are used throughout the drawings to reference like features.

DETAILED DESCRIPTION

Combined web browsing and searching is discussed herein. While browsing Web pages, a search box is displayed to the user. A set of query terms are made available for selection by the user, such as via a drop-down menu associated with the search box. The set of query terms is automatically determined based at least in part on context information for the user and/or information regarding previous searches. This context information can include, for example, information regarding a Web page currently displayed, information regarding Web pages previously displayed, information regarding a link selected by a user to navigate from one page to another, and so forth. Once a query term is entered in the search box, whether by selection from the set of displayed query terms or by other input mechanisms, the user can select to search for the query term. If requested by the user, the search results are displayed using a preview mode in which the Web page currently being browsed by the user is displayed as one part of the Web page, and the search results are displayed as another part of the Web page.

Figure 1:
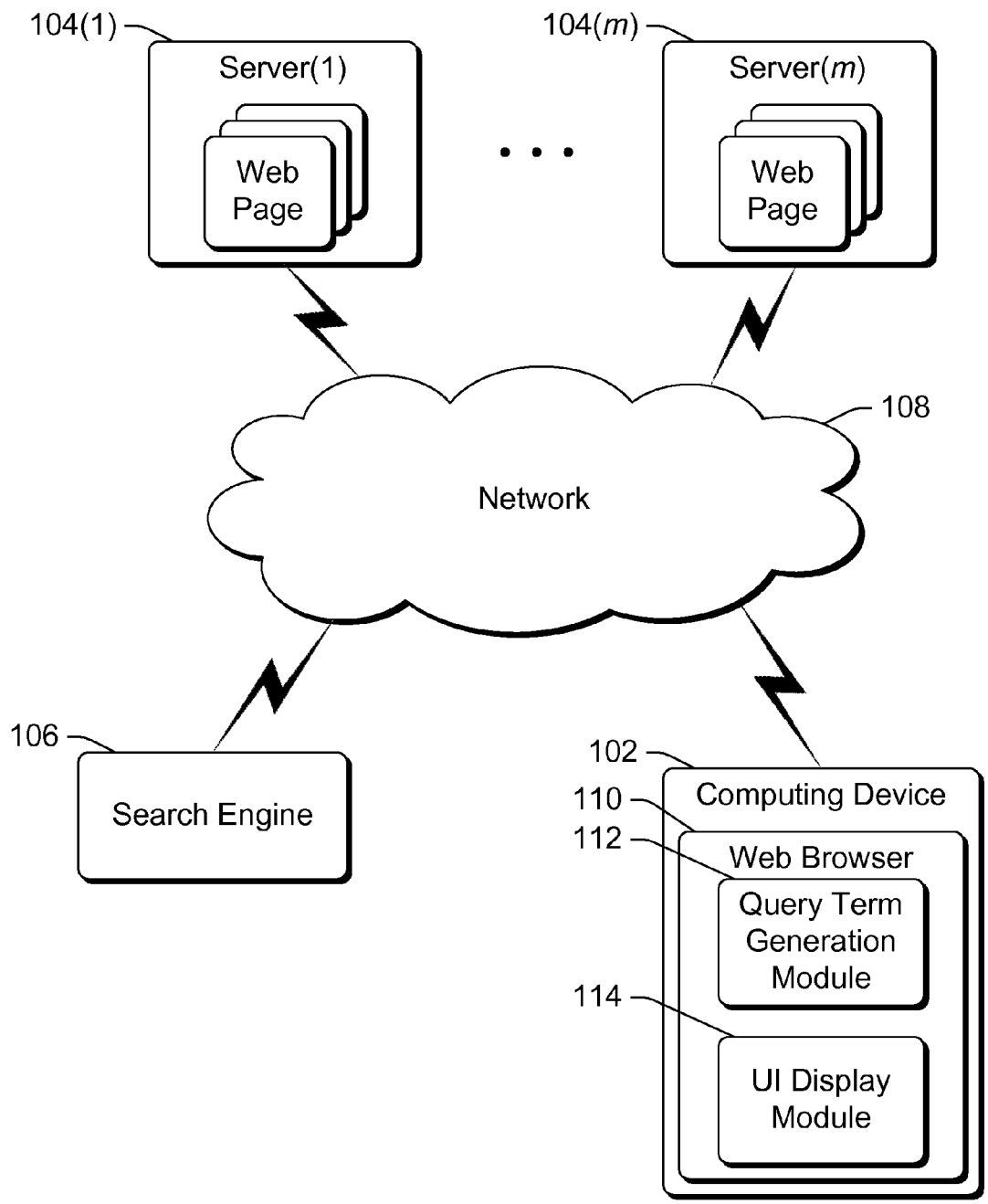
FIG. 1 illustrates an example system in which the combined web browsing and searching can be used in accordance with one or more embodiments.

FIG. 1 illustrates an example system 100 in which the combined web browsing and searching can be used in accordance with one or more embodiments. System 100 includes a computing device 102 that can communicate with one or more (m) servers 104 and a search engine 106 via a network 108. Network 108 can be any of a variety of networks, including the Internet, a local area network (LAN), a public telephone network, an intranet, other public and/or proprietary networks, combinations thereof, and so forth.

Computing device 102 can be any of a variety of devices capable of displaying Web pages. For example, computing device 102 can be a desktop computer, a mobile station, an entertainment appliance, a set-top box communicatively coupled to a display device, a wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Servers 104 can be any of a variety of different computing devices capable of hosting Web pages that can be retrieved and displayed by a Web browser 110 of computing device 102. Similar to the discussion of computing device 102, servers 104 can be any of a variety of different devices, ranging from full resource devices with substantial memory and processor resources to a low-resource device with limited memory and/or processing resources.

Search engine 106 is one or more components that return search results in response to search requests. Search engine 106 can be implemented on any of a variety of different computing devices, analogous to devices 102, capable of generating search results. Although a single search engine 106 is illustrated in FIG. 1, alternatively multiple search engines 106 can be included in system 100.

Search engine 106 can be a search engine for the Web or for a particular Web site. In situations where search engine 106 is a search engine for the Web, search engine 106 typically includes, or has access to, a database of Web pages accessible via network 108 that have been indexed by search engine 106. In response to a search request, this database is searched to identify one or more Web pages accessible via network 108 that satisfy the query term of the search request.

In situations where search engine 106 is a search engine for a Web site, search engine 106 typically includes, or has access to, a database of Web pages that are included in the Web site. In response to a search request, this database is searched to identify one or more Web pages that are included in the Web site and that satisfy the query terms of the search request. Search engines and the generation of search results are well known to those skilled in the art and thus will not be discussed further except as they pertain to the combined web browsing and searching discussed herein.

Computing device 102 includes Web browser 110 having a query term generation module 112 and a user interface (UI) display module 114. Query term generation module 112 generates a set of query terms for display in a drop-down menu associated with a search box. The set of query terms is automatically determined based at least in part on context information for the user and/or information regarding previous searches and navigation behavior. UI display module 114 generates a UI display for Web browser 110, including a search box and corresponding drop-down menu that includes the set of query terms, and a preview mode in which the Web page currently being browsed by the user is displayed in one portion of the Web browser window and the search results are displayed in another portion of the Web browser window. The generation of the set of query terms and the UI display are discussed in more detail below.

Figure 2:
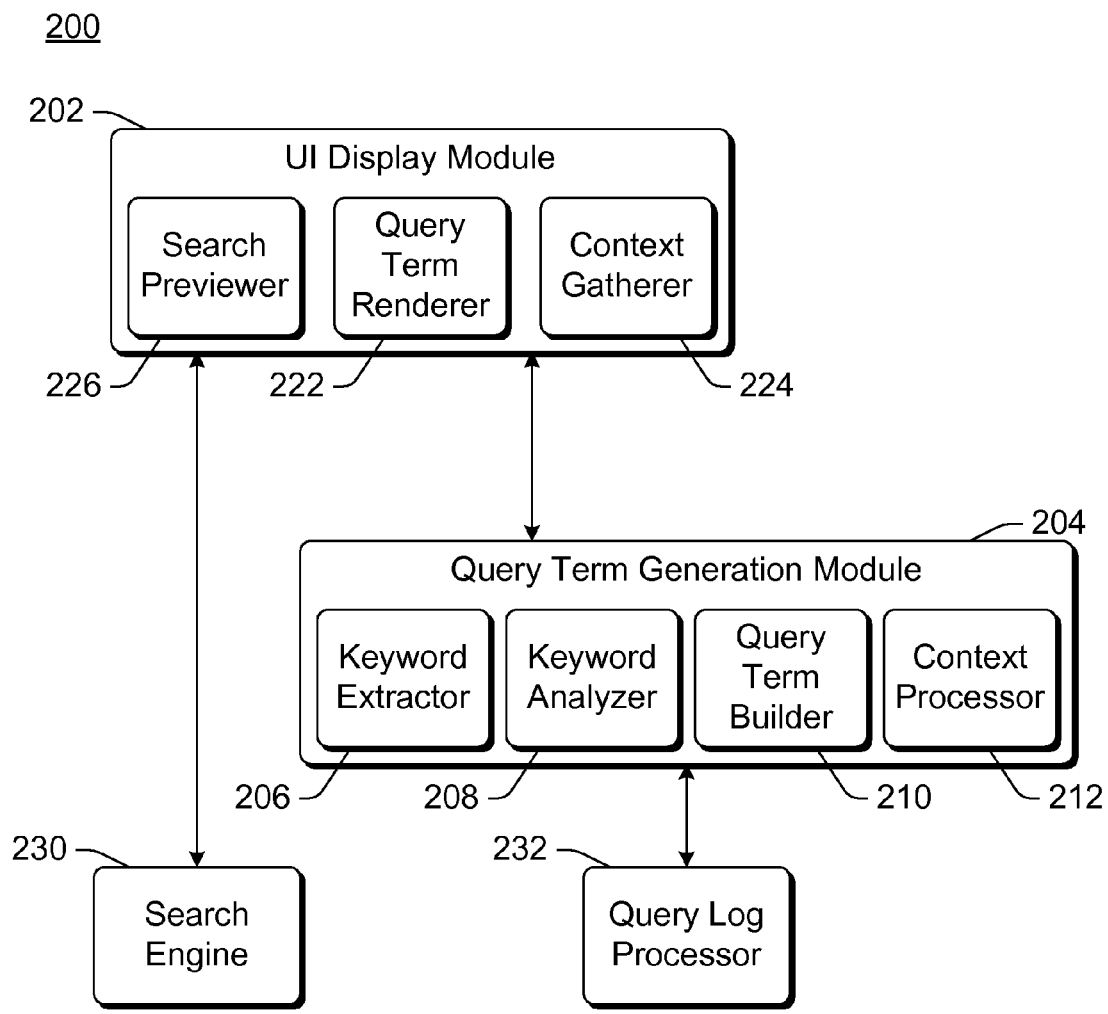
FIG. 2 is a block diagram illustrating an example system implementing the combined web browsing and searching in accordance with one or more embodiments.

FIG. 2 is a block diagram illustrating an example system 200 implementing the combined web browsing and searching in accordance with one or more embodiments. System 200 includes UI display module 202 and query term generation module 204. In one or more embodiments, module 202 is module 114 of FIG. 1, and module 204 is module 112 of FIG. 1.

Query term generation module 204 generates a set of query terms for display in a drop-down menu associated with a search box. Generally, a set of query words or keywords is generated based on context information, such as a current location of system 200, information regarding a Web page currently being displayed by system 200, information regarding Web pages previously displayed by system 200, information regarding a browsing pattern of a user of system 200, and so forth. From this set of keywords, a set of query terms is generated using information regarding current popular searches by other users. Alternatively, other information can also be used in generating the set of query terms, such as any previous searches made by the user, any previous Web pages browsed to by the user, and so forth. The searching and browsing paradigms are combined by providing query terms for searching based at least in part on Web pages being browsed to by the user.

UI display module 202 generates a user interface including a search box and a corresponding drop-down menu that includes the set of query terms generated by query term generation module 204. UI display module 202 also supports multiple different modes in which search results can be displayed to a user. One display mode supported by module 202 is a preview mode in which the Web page currently being browsed by the user is displayed as one part of the Web page and the search results are displayed as another part of the Web page. In one or more embodiments this display mode may appear to the user as the Web browser having two different portions, one in which the Web page is displayed and another in which the search results are displayed. However, this appearance is typically created by having a Web page include and display both of these parts rather than altering the Web browser to accommodate two such portions. Alternatively, the Web browser could support two such separate portions.

Selection of a button or other portion of a UI being displayed is discussed herein. Such a selection can be made in any of a variety of different manners. In one or more embodiments, a selection is made by maneuvering a cursor over the button or other portion and activating a button on a cursor control device (e.g., clicking a mouse button). Alternatively, directional keys or a tab key on a keyboard can be used to cycle through different portions (e.g., different buttons), and the portions can be changed (e.g., highlighted) to show when they are being selected. An "enter" key can optionally be used to select a particular one of those portions. Alternatively other selection mechanisms can be used, such as function keys, particular alphanumeric key sequences, and so forth.

Figure 3:
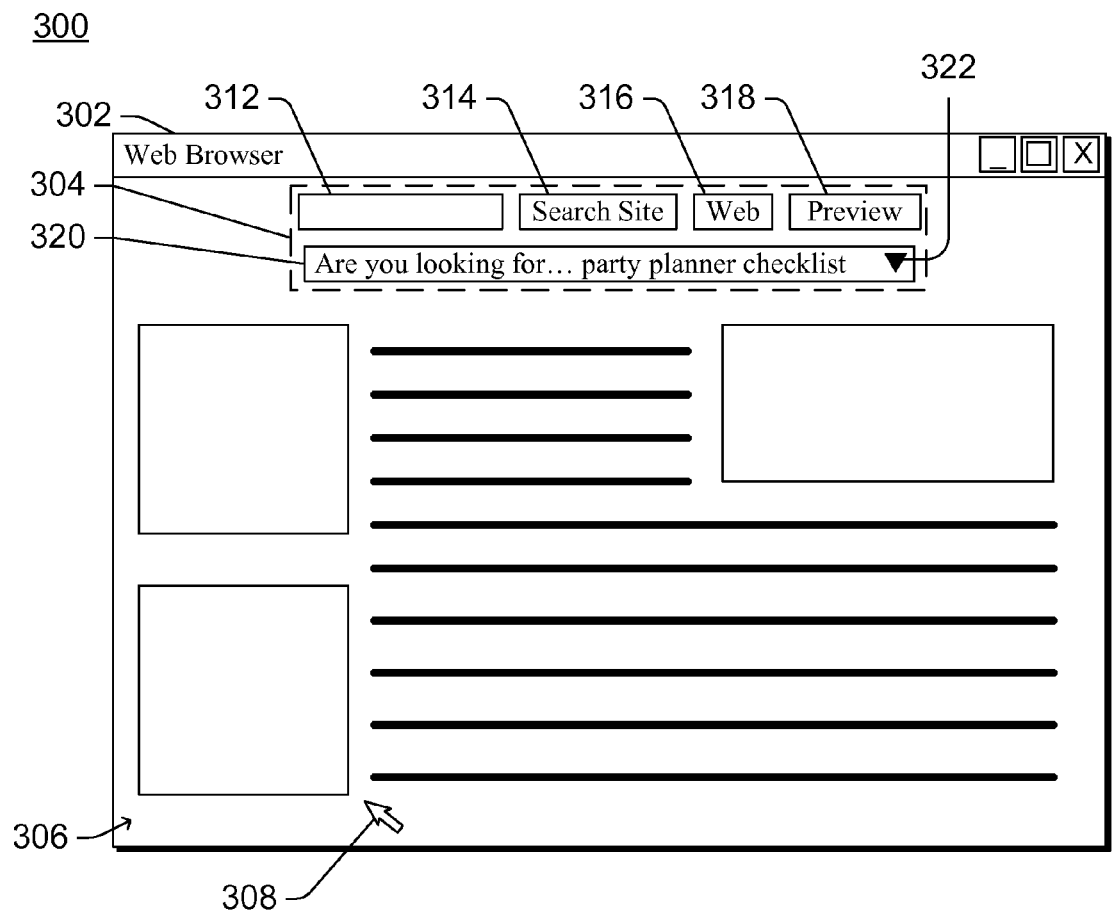
FIG. 3 illustrates an example display supporting the combined web browsing and searching in accordance with one or more embodiments.

FIG. 3 illustrates an example display 300 supporting the combined web browsing and searching in accordance with one or more embodiments. Display 300 is displayed by computing device 102 of FIG. 1, and can be displayed by any of a variety of different types of display devices (e.g., a monitor, a projector, a mobile device or cell phone screen, and so forth). In display 300, a Web browser window 302 displays search options 304 and a Web page 306. Web page 306 can include any of a variety of different information, such as text (displayed as horizontal lines in Web page 306) and images (displayed as boxes in Web page 306). Other types of information can also be included in Web page 306, such as movies or video, audio, and so forth.

Also illustrated in display 300 is a cursor 308. Cursor 308 can take any of a variety of forms and can be moved around display 300 using any of a variety of different cursor control devices. The user can move cursor 308 around window 302 and select a particular portion (e.g., a button in search options 304, a link in Web page 306, etc.) using the cursor control device (e.g., clicking a mouse button, pressing an "enter" or "select" button, and so forth). A particular portion can also be selected by moving a cursor over the particular portion and leaving the cursor over that particular portion for an amount of time (also referred to as "hovering"). Cursors and cursor control devices are well known to those skilled in the art and thus will not be discussed further.

Search options 304 (also referred to as tools or components) are identified within a dashed box in FIG. 3, and include a search box 312, a search site button 314, a search web button 316, a search preview button 318, and a query term drop-down menu 320. In the example of FIG. 3, search options 304 are illustrated as part of Web page 306 and separate from any toolbar or menu of browser window 302. Alternatively, search options 304 could be included in a toolbar of browser window 302.

Search box 312 is a data entry box via which a user can enter one or more query terms. The query terms can be entered in search box 312 in different manners. The user can enter query terms manually, such as by using a keyboard or other data entry device allowing the user to type, write, or otherwise identify particular words or alphanumeric sequences that are to be the query terms.

The user can also use query term drop-down menu 320 to enter query terms. Drop-down menu 320 can be selected by the user in different manners, such as hovering cursor 308 over a portion of menu 320, selecting a drop-down arrow 322 in menu 320, and so forth. Drop-down menu 320 includes one or more query terms that are generated by a query term generation module, such as 204 of FIG. 2. The query terms in drop-down menu are terms that the query term generation module automatically determines as being likely terms that the user would want to search for. In one or more embodiments, the one of those terms that is determined to be the term that the user is most likely to want to search for is displayed in menu 320 even when menu 320 has not been selected. In the example of FIG. 3, this most likely query term is "party planner checklist".

In one or more embodiments, search options 304 are dynamically inserted into Web page 306, so both Web page 306 and search options 204 are displayed in Web browser window 302. In such embodiments, code (e.g., HyperText Markup Language (HTML) code) and/or scripts are added to Web page 306 so that search options 304 are displayed when Web page 306 is displayed. This code or scripts can be added in any of a variety manners, such as using Dynamic HTML (DHTML) technologies, Asynchronous JavaScript and XML (AJAX) technologies, and so forth.

In alternate embodiments, rather than dynamically inserting the search options 304 into Web page 306, the Web browser can display Web browser window 302 having two separate portions. Search options 304 are displayed in one of these two portions, and Web page 306 is displayed in the other of these two portions. In such embodiments no additional code need be added to Web page 306 in order for search options 304 to be displayed.

Figure 4:
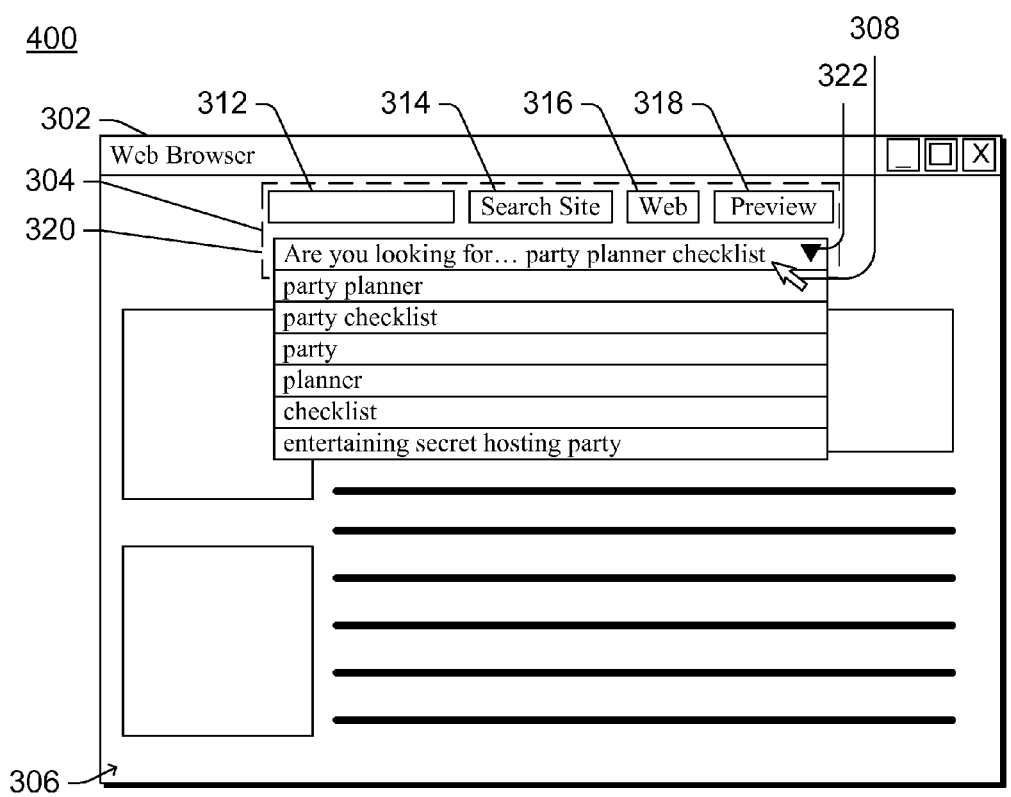
FIG. 4 illustrates another example display supporting the combined web browsing and searching in accordance with one or more embodiments.

FIG. 4 illustrates another example display 400 supporting the combined web browsing and searching in accordance with one or more embodiments. Display 400 is displayed by computing device 102 of FIG. 1, and can be displayed by any of a variety of different types of display devices (e.g., a monitor, a projector, and so forth). Display 400 is similar to display 300 of FIG. 3. A Web browser window 302 displays search options 304 and a Web page 306. Search options 304 include a search box 312, a search site button 314, a search web button 316, a search preview button 318, and a query term drop-down menu 320 with a drop-down arrow 322.

Display 400, however, illustrates drop-down menu 320 in expanded form after having been selected by a user. Several additional query terms are displayed in the drop-down menu, these being additional query terms that the query term generation module determines as being likely terms that the user would want to search for. The query terms can be organized in drop-down menu 320 in different manners, such as in accordance with how likely the query term generation module determines the user would want to search for the query terms (e.g., more likely terms being listed at the top of the list), alphabetically, randomly, and so forth. In the example of FIG. 4, the additional query terms are: party planner checklist, party planner, party checklist, party, planner, checklist, and entertaining secret hosting party.

Different query terms can be included in drop-down menu 320 based on context information, information regarding Web page 306, one or more logs of query terms entered by other users on other systems, and so forth. The manner in which the query term generation module determines the query terms for the query term drop-down menu is discussed in more detail below.

Returning to FIG. 3, the user can select any of the query terms from drop-down menu 320. This selection can be performed in different manners, such as hovering cursor 308 over one of the query terms, maneuvering cursor 308 over a query term and clicking on a button of a cursor control device, and so forth. Drop-down menu 320 corresponds to search box 312, so once a query term is selected from drop-down menu 320 the selected query term is entered into search box 312. This selected query term is thus displayed in search box 312.

Regardless of how the query term is entered in search box 312, once the query term is entered in search box 312 the user can select one of search site button 314, search web button 316, and search preview button 318. In response to user selection of search site button 314, the query terms entered in search box 312 are input to a search engine that searches the Web site that includes Web page 306 for the query terms. A new Web page is then displayed, replacing Web page 306, that includes the search results from the search engine. In one or more embodiments, search options 304 are displayed on the new Web page with the search results, although alternatively search options 304 may not be displayed.

In response to user selection of search web button 316, the query terms entered in search box 312 are input to a search engine that searches the Web for the query terms. A new Web page is then displayed, analogous to that of when the search site button 314 is selected (although the search results will typically be different). Alternatively, other search scope buttons can be used in addition to and/or in place of search web button 316 and search site button 314, such as a button to search a particular department, a button to search a particular category, and so forth.

In response to user selection of search preview button 318, the query terms entered in search box 312 are input to a search engine that returns search results. Whether the search engine searches the Web or just the Web site that includes Web page 306 can be determined in different manners. For example, button 318 can be associated with only searching a Web site or alternatively only searching the Web, button 318 can default to searching one of the Web or the Web site, a user preference can be set by the user indicating whether to search the Web or the Web site, the user can concurrently select one of buttons 314 and 316 along with button 318 to indicate whether to search the Web or the Web site, two different buttons can be displayed (e.g., a search preview button for searching the Web and a search preview button for searching the Web site), and so forth.

In response to user selection of preview button 318, the search results that are returned by the search engine in response to user selection of preview button 318 are displayed in Web browser window 302 concurrently with Web page 306 rather than replacing Web page 306. In one or more embodiments, the search results are dynamically inserted into Web page 306, so both the Web page 306 and the search results are displayed in Web browser window 302. In such embodiments, code (e.g., HyperText Markup Language (HTML) code) is added to Web page 306 so that the search results are displayed when Web page 306 is displayed. This code can be added in any of a variety manners, such as using Dynamic HTML (DHTML) technologies, Asynchronous JavaScript and XML (AJAX) technologies, and so forth.

In alternate embodiments, rather than dynamically inserting the search results in to Web page 306, the Web browser can display Web browser window 302 having two separate portions. The search results are displayed in one of these two portions, and the Web page 306 is displayed in the other of these two portions. In such embodiments no additional code need be added to the Web page 306 in order for the search results to be displayed.

Figure 5:
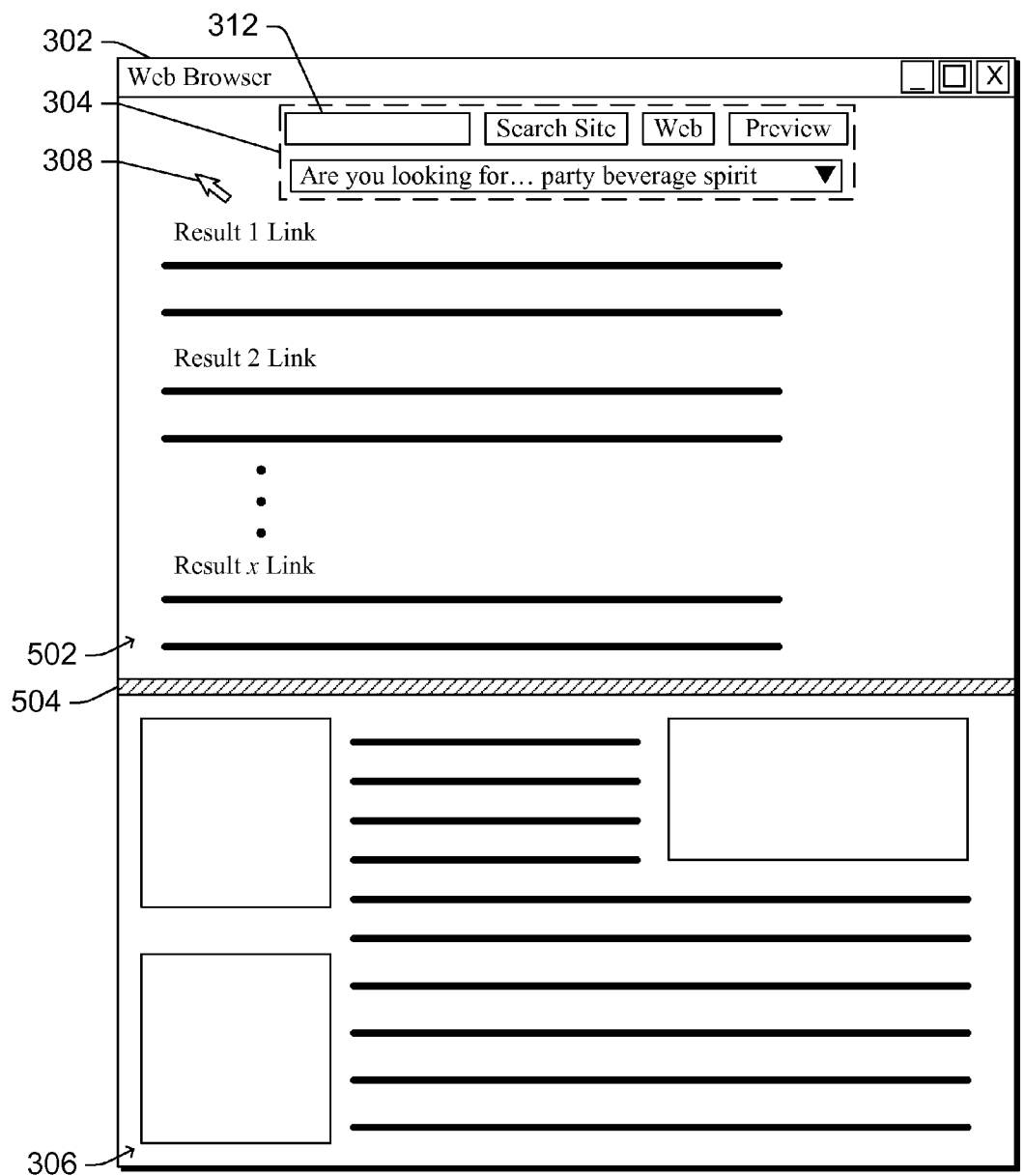
FIG. 5 illustrates another example display supporting the combined web browsing and searching in accordance with one or more embodiments.

FIG. 5 illustrates another example display 500 supporting the combined web browsing and searching in accordance with one or more embodiments. Display 500 is displayed by computing device 102 of FIG. 1, and can be displayed by any of a variety of different types of display devices (e.g., a monitor, a projector, and so forth). Analogous to FIGS. 3, and 4, display 500 includes a Web browser window 302 displaying search options 304, Web page 306, and a cursor 308. However, Web browser window 302 displays both Web page 306 and search results 502 concurrently, optionally with a visual separator 504 displayed to allow the user to easily distinguish between these two parts.

Search results 502 are the search results returned by the search engine in response to a search preview button having been selected (e.g., button 318 of FIGS. 3 and 4). The search results are illustrated as including a link to a Web page (e.g., "Result 1 Link", "Result 2 Link", etc.), as well as some text (illustrated as horizontal lines) that describe the Web page. The data illustrated as search results 502 can take any of a variety of forms. For example, images can be displayed in addition to (or in place of) text, images can be displayed as the links, videos can be displayed in addition to (or in place of) text or as the links, a portion of the Web page that includes the query term can be displayed as the text, a summary of the Web page can be displayed as the text, and so forth.

Search options 304 are also displayed as being included in the same portion as search results 502. Alternatively, search options 304 can be included in the same portion as Web page 306, or may not be displayed in window 302. In the example of FIG. 5, the query term(s) in the query term drop-down menu of search options 304 has changed in response to the user selection of the search preview button. This change is made as a result of new query terms having been searched on when the user selected the search preview button.

FIG. 5 illustrates an example concurrent display of search results and the current Web page. It is to be appreciated that this concurrent display can be accomplished in different manners. For example, window 302 can be separated horizontally into two portions rather than vertically. By way of another example, the portion including search results can be displayed in different manners, such as a border around Web page 306 that includes the search results, portions including search results being displayed within Web page 306 (e.g., appearing as part of Web page 306), and so forth.

The user can select one of the links in search results 502, in response to which the two portions displayed in window 302 are replaced with a single portion that includes the Web page (e.g., analogous to FIG. 3, although the Web page being displayed would be different). Search options 304 would be included with this Web page display, and the query terms in the query term drop-down menu are optionally updated to reflect the new context due to the new Web page being displayed.

Additionally, rather than selecting a link in search results 502, the user can input new query terms in the search box 312 displayed in window 302 of display 500 and select the search preview button. In response, a new search is performed and the results are displayed as search results 502. This allows the user to repeatedly enter new query terms and have a preview display of new search results 502 displayed concurrently with the current Web page 306.

Furthermore, in one or more embodiments, the user can exit out of the concurrent search results and Web page display of FIG. 5. After exiting, the two portions of the Web page are replaced with a single portion that includes Web page 306 (analogous to FIG. 3). Alternatively, after exiting the two portions of the Web page displayed in window 302 can be replaced with a single portion that includes search results 502 (and optionally search options 304). This exiting from the concurrent search results and Web page display can be accomplished in different manners, such as by selecting an "exit" or "close" option displayed in window 302 (e.g., in search results 502), by selecting an "exit" or "close" button or key on a keyboard or other input device, and so forth.

As can be seen from FIG. 5, both the current Web page and the search results are displayed concurrently in the same window 302. This combines the searching and browsing paradigms by allowing the user to view Web pages and search results concurrently.

The combined web browsing and searching are discussed herein with reference to query terms being displayed in a drop-down menu. It is to be appreciated, however, that the use of a drop-down menu is only one example user interface for displaying the query terms. The query terms can alternatively be displayed in different manners, such as a list of query terms separated by commas, a list of query terms separated by spaces, or any other technique for displaying the different query terms.

Returning to FIG. 2, UI display module 202 generates a UI display including a search box and a corresponding query term drop-down menu, and also supports multiple different modes in which search results can be displayed to a user. UI display module 202 includes query term renderer 222, context gatherer 224, and search previewer 226.

Query term renderer 222 obtains the query terms to be included in the query term drop-down menu from query term generation module 204. Renderer 222 then displays the query term drop-down menu including these obtained query terms. Renderer 222 obtains new query terms from query term generation module 204 each time a new search is requested by the user (e.g., by selection of a search site button, a search web button, or a search preview button). Additionally, the context information gathered by context gatherer 224 changes each time a different Web page is browsed to or navigated to by the user, so renderer 222 obtains new query terms from query term generation module 204 each time a different Web page is browsed to or navigated to by the user.

In one or more embodiments, the query term drop-down menu is displayed, as is the search box and buttons of the search options illustrated in FIGS. 3, 4, and 5, for each Web page. UI display module 202 and query term generation module 204 are implemented as part of a Web browser (e.g., Web browser 110 of FIG. 1), and thus can insert the search options (including the query term drop-down menu) on each Web page. Alternatively, UI display module 202 and query term generation module 204 can be implemented as part of a Web page, and thus are displayed only for Web pages that include modules 202 and 204.

Context gatherer 224 collects and maintains context information regarding the user of system 200 to be used to generate the query terms. The context information maintained by context gatherer 224 is passed to query term generation module 204 for generation of the query terms. Context gatherer 224 can pass the context information to query term generation module 204 in different manners. In one or more embodiments, context gatherer 224 generates a cookie that is stored in system 200 and can be read when the next Web page is accessed for display by system 200. Alternatively, the context information can be passed in different manners, such as by invoking one or more application programming interfaces (APIs) exposed by query term generation module 204, by invoking other processes or functions of module 204, and so forth.

The context information maintained by context gatherer 224 is context information for a user of system 200. Any information regarding the user's browsing and/or searching can be maintained as context information by gatherer 224.

Examples of context information include browse context and history, location information, page analysis and/or scraping, previous queries, and so forth. The context information is used by context processor 212 to select particular keywords, as discussed in more detail below.

The browse context and history context information refers to the current Web page and the previous Web pages (if any) that the user has browsed to during the current Web browsing session. A Web browsing session (or browsing session) refers to the running of a Web browser application that displays a browser window (e.g., window 302 of FIGS. 3, 4, and 5). A new browsing session begins each time the Web browser (e.g., browser 110 of FIG. 1) begins running, after a browsing session becomes stale (e.g., after a threshold amount of time, such as 20-30 minutes, with no user inputs to the Web browser), and so forth. In situations where multiple instances of a Web browser are running concurrently, each instance is considered a separate browsing session.

The browse context and history context information can include keywords from the URL (Uniform Resource Locator) of the current and/or previous Web pages accessed (e.g., browsed to, or navigated to as a result of a search) by the user. The browse context and history can also include keywords from a link in a Web page that was selected by the user (e.g., if a link to "local auto dealers" was selected by the user, the words local, auto, and dealers can be included in the browse context and history). The keywords refer to the words that represent substantive information. For example, "a", "the", "to", "and", "for", and so forth, typically referred to as noise words, do not typically represent substantive information and thus would not be included as keywords. The specific identification of which words are keywords and which words are not keywords can vary by implementation and on the desires of the system designer. Alternatively, the browse context and history gathered by context gatherer 224 can be all words (e.g., from the URL, from links, etc.) rather than just the keywords, and keyword extractor 206 can extract the keywords as discussed in more detail below.

The location information context information refers to the current geographical location of the system in which the combined web browsing and searching is implemented. This location can be determined in any of a variety of different manners. For example, the IP (Internet Protocol) address of the system can be used to lookup a geographic location of the system. By way of another example, the system can include a GPS (Global Positioning System) receiver that allows the system to determine its geographical location. By way of yet another example, the user of the system could input information identifying his or her current location (e.g., by zip code, by latitude and longitude, and so forth).

The page analysis and/or scraping context information refers to information on a Web page and/or associated with the Web page. This information is maintained as context information for each Web page accessed by the user during the browsing session. For example, this information can be a summary of the Web page that is automatically generated from the Web page or is created by a Web page author (or other party) and distributed with the Web page. By way of another example, this information can be the keywords (or alternatively all of the words) that are included as text of the Web page. By way of yet another example, this information can be title information or other metadata associated with the Web page.

Search previewer 226 sends the query term entered by the user (entered manually or by selection of a query term from the query term drop-down menu) to search engine 230. Search previewer 226 receives the search results from search engine 230 and displays a preview of the search results concurrently with the Web page already being displayed (e.g., as discussed above with respect to FIG. 5).

Search engine 230 is typically a remote search engine accessed over the Internet. Search engine 230 can be, for example, search engine 106 of FIG. 1. The remote search engine can be a Web search engine that searches across different Web pages and Web sites of the Web, or alternatively a Web site search engine that searches across only Web pages of a particular Web site. Alternatively, the search engine can be a local search engine, implemented on the same device as system 200 or on a device accessed locally (e.g., via a LAN) rather than via the Internet.

UI display module 202 optionally includes additional modules (not shown) providing additional functionality for the display of a combined web browsing and searching user interface. For example, additional modules controlling the display of a Web page, displaying search results (when not being previewed), and so forth can be included in UI display module 202 or alternatively in another module of system 200.

Query term generation module 204 generates the query terms and returns the query terms to UI display module 202. The query terms can be returned in different manners, such as in response to an API exposed by module 204 that is invoked by UI display module 202, by invoking an API exposed by module 202, by accessing another process or function made available by module 202, and so forth.

Query term generation module 204 includes a keyword extractor 206, a keyword analyzer 208, a query term builder 210, and a context processor 212 to assist in generating the set of keywords and/or query terms. Query term generation module 204 also accesses a query log processor 232 to assist in the generation of query terms, as discussed in more detail below.

Context processor 212 obtains the context information gathered by context gatherer 224 and makes it available to the other components of query term generation module 204.

Keyword extractor 206 identifies or extracts keywords based on the context information from context processor 212. As discussed above, the context information can include one or more of browse context and history, location information, and page analysis and/or scraping information. The keywords can be extracted from the Web pages or from other sources, such as metadata associated with the Web pages. This different context information typically includes text, and keywords are extracted from the text by keyword extractor 206.

The keywords refer to the words that represent substantive information. For example, "men", "shoes", "party", "beverages" all represent substantive information and thus would be considered keywords, whereas "a", "the", "to", "and", and "for", do not typically represent substantive information and thus would not be considered keywords. Keywords can be identified by keyword extractor 206 in any of a variety of manners. For example, words from different sources can be weighted more heavily (deemed as being more important) than words from other sources (e.g., title information for a Web page may be weighted more heavily than text displayed as part of the Web page). By way of another example, the words can be ranked according to their weighting, the frequency with which they occur, and/or in other manners and a certain number of words that are ranked the highest can be the extracted keywords. The specific identification of which words are keywords and which words are not keywords can vary by implementation and on the desires of the system designer.

Additionally, various filtering can be imposed by keyword extractor 206 to exclude certain words that represent substantive information from being keywords. For example, profanity, sexual terms, hate terms, and so forth can be filtered out by keyword extractor 206 so that they are not identified as keywords regardless of the context information obtained from context processor 212.

In one or more embodiments, keyword extractor 206 identifies keywords based on the current Web page being displayed and the previous Web pages that were displayed in the current Web browsing session. When during a Web browsing session a user browses from one Web site to another, keyword extractor 206 attempts to determine whether the two Web sites are related. If the two Web sites are related, then the context information from previous Web sites is kept as context information and thus is used by keyword extractor 206 in identifying keywords. Context information from Web sites accessed longer ago can be removed (or alternatively weighted lower) as new Web sites are accessed during the current Web browsing session. However, if the two Web sites are not related, then the context information from previous Web sites is not used by keyword extractor 206 in identifying keywords.

For example, if a user browses from a Web page of one Web site describing a particular make and model of car to a Web page of another Web site describing the current weather forecast, then the two Web sites are not related. However, if a user browses from a Web page of one Web site describing a first make and model of car to a Web page of another Web site describing a second made and model of car, then the two Web sites are related (e.g., both describing cars).

Whether two Web sites are related can be determined in different manners. For example, a set of categories can be established and made available to keyword extractor 206, with Web sites in the same category being related. By way of another example, other rules, processes, or algorithms can be used for keyword extractor 206 to automatically identify whether two Web sites are related.

In one or more embodiments, keyword extractor 206 also identifies additional keywords by generalizing keywords to obtain categories to which the keywords correspond. For example, if one of the keywords was a particular make of car, then extractor 206 can generate additional keywords of "car", "automobile", and so forth. By way of another example, if one of the keywords was a particular model of car, then extractor 206 can generate additional keywords of "sub-compact", "luxury", and so forth.

These categories can be determined in any of a variety of different manners. For example, a list or other record of mappings of particular keywords to categories can be maintained and made available to keyword extractor 206. Alternatively, these categories can be determined in other manners, such as using processes or algorithms that monitor keywords and automatically identify categories for those keywords.

In one or more embodiments, keyword extractor 206 also identifies additional keywords by identifying the commonality among multiple web pages being browsed. For example, if one of the Web pages being browsed described a first make and model of car, and another of the Web pages being browsed described a second make and model of car, then extractor 206 can generate additional keywords that describe the commonality of those two makes and models of cars, such as "sub-compact cars", "light trucks", "SUVs", and so forth.

This commonality can be identified in any of a variety of different manners. For example, a list or other record of mappings of particular keywords to categories can be maintained and made available to keyword extractor 206. This list or other record can then be analyzed given keywords obtained from each Web page (based on the context information obtained from context processor 212) to identify which categories are common to multiple Web pages being browsed. Alternatively, these categories can be identified in other manners, such as using processes or algorithms that monitor keywords for Web pages and automatically identify commonality among those keywords.

In one or more embodiments, the identification of additional keywords by generalizing keywords to obtain categories to which the keywords correspond and/or by identifying the commonality among multiple web pages being browsed is performed by keyword extractor 206 as discussed above. Such keywords are thus provided to query log processor 232 as discussed in more detail below. Alternatively, the identification of categories and/or commonality discussed above can be performed by keyword analyzer 208. In such embodiments, the keywords for categories and/or commonality are not provided to query log processor 232, but rather are added to the query terms returned by query log processor 232. For example, if query log processor 232 returned a query term including a particular make and model of car, then an additional query term of "sub-compact cars" can be added to the query terms.

Keyword extractor 206 sends one or more keywords to keyword analyzer 208. In one or more embodiments, keyword extractor 206 sends all keywords that have been extracted from the context information to keyword analyzer 208. Alternatively, keyword extractor 206 selects only some of the keywords that have been extracted and sends those selected keywords to keyword analyzer 208. Keyword extractor 206 can select keywords in different manners, such as by selecting heavier-weighted or higher-ranking keywords rather than lighter-weighted or lower-ranking keywords, randomly, according to some other processor method that assigns an importance to the keywords so that keywords deemed as being more important are selected, and so forth.

Keyword analyzer 208 identifies, based on the keywords received from keyword extractor 206 and/or information regarding previous searches, the query terms. This information regarding previous searches can be any of a variety of different information, such as query terms previously searched for by the user, query terms previously searched for by one or more other specific users, query terms for current popular searches, and so forth. Current popular searches can refer to query terms frequently searched for by other users, most frequently viewed Web pages, most frequently emailed Web pages, Web pages most frequently commented on, and so forth.

Keyword analyzer 208 sends the keywords from keyword extractor 206 to query log processor 232, which in turn accesses one or more logs of recent queries by the user or alternatively by multiple users. For example, these recent queries can be the most recent queries (e.g., over the past 24 hours, the past week, etc.) that have been received by a particular search engine. Alternatively, more individualized query logs can optionally be maintained, allowing only those query logs that correspond to the user to be accessed by query log processor 232. For example, different query logs can be maintained for individual users, or for groups of users based on various personal information, such as gender, age, income bracket, interests or hobbies, and so forth. For users desiring to disclose this personal information, these different query logs can be maintained and accessed by query log processor 232.

In one or more embodiments, different search engines and/or other parties on the Web keep track of queries that are made over different time frames and generate rankings or other information identifying the most popular query terms that have been searched for (the query terms that have been searched for most frequently). Query log processor 232 accesses any one or more of these search engines and/or other parties and identifies the most popular query terms that include the keywords received from keyword analyzer 208. Query log processor 232 can identify only those query terms that include all of the keywords received from keyword analyzer 208, or alternatively fewer than all of the keywords (e.g., any query term including at least one keyword received from analyzer 208). Alternatively other "popular" results can be identified as discussed above, such as current popular viewed search results, current popular emailed and/or commented Web pages, and so forth.

In other embodiments, query log processor 232 (or alternatively another component or device) maintains one or more logs of queries made by the user of system 200 and/or one or more specific other users (e.g., additional users identified by the user of system 200). Query log processor 232 can access these one or more logs to obtain information on previous searches by the user of system 200 and/or one or more specific other users. The most popular query terms for the current user and/or the one or more specific other users can then be identified by query log processor 232.

Query log processor 232 returns these identified popular query terms to keyword analyzer 208. Keyword analyzer 208 forwards a particular number of these popular query terms to query term builder 210. If more than this particular number are returned by query log processor 232, then keyword analyzer 208 determines which of the query terms to forward to query term builder 210. This determination can be made in different manners, and in one or more embodiments is made so that the query terms that the user is most likely to want to search for are forwarded to query term builder 210. For example, this determination can be made based on the popularity of the query terms, how many of the keywords received from keyword extractor 206 are include in the query terms, randomly, based on other delivery methods, and so forth.

In one or more embodiments, a set of delivery methods (also referred to as delivery techniques) is used to determine which query terms are to be forwarded to query term builder 210 include one or more of an expansion method, a category method, a sibling method, an intersection method, and an inference method. These delivery methods can be based on one or more of information obtained from query log processor 232 regarding previous searches, context information obtained by context processor 212, location information, and so forth.

The expansion method refers to expanding out the keywords so that the query terms include additional keywords that were not necessarily received from keyword extractor 206. For example, assume a user is browsing Web pages for new cars and has accessed a Web page describing a particular make and model of car. This make and model can be part of the query term, and the expansion method can select query terms that include both the make and model as well as additional words such as "comparison", "buying", "bluebook", "road test", and so forth.

The category method refers to identifying general categories that the keywords received from keyword extractor 206 are part of. For example, assume a user is browsing Web pages for new cars and has accessed a Web page describing a particular make and model of car. Query terms including keywords that are general categories for that particular make and/or model of car can be used, such as "sub-compact cars", "luxury cars", and so forth.

The sibling method refers to identifying query terms that share some but not all of the keywords received from keyword extractor 206. For example, assume a user is browsing Web pages for new cars and has accessed a Web page describing a particular make and model of car. The make of the car can be part of the query term, but other models of cars can be included in the query term rather than that particular model of car.

The intersection method refers to identifying commonality or connections among multiple Web pages being browsed. For example, assume a user is browsing Web pages for new cars and has accessed two Web pages, the first Web page describing a first make and model of car and the second Web page describing a second make and model of car. Query terms including keywords that describe the commonality among these two makes and models of cars can be used, such as "sub-compact cars", "popular Japanese cars", and so forth.

The inference method refers to inferring additional keywords assumed to be desired by the user based on other keywords entered by the user. For example, assume that a user has searched on "Hawaii" and "beach". If most people who search on Hawaii beaches (or in this user's previous searching on Hawaii beaches) also search on "surfing", then "surfing" can be added as part of the query term.

Keyword analyzer 208 can determine which one or more of these expansion method, category method, sibling method, intersection method, and inference method to use in any of a variety of manners. In one or more embodiments a set of rules is made available to keyword analyzer 208 to identify which method(s) to user. These rules can be determined in different manners, such as empirically, based on the desires of the designer of system 200, and so forth. These rules can take any of a variety of different forms. For example, a rule can indicate that when the user is navigating from one web site to another rather than browsing web pages deeper into the directory structure of the web site, then the category method is to be used. By way of another example, a rule can indicate that when the user is browsing Web pages going deeper into the directory structure of the same web site rather than browsing to different web sites, then the expansion method is to be used.

It is to be appreciated that any of a wide variety of different rules can be developed and used to determine which one or more of these expansion method, category method, sibling method, intersection method, and inference method to use. Alternatively, other techniques can be employed, such as using other processes or algorithms that automatically select one or more of these expansion method, category method, sibling method, intersection method, and inference method to use based on one or more of context information obtained from context processor 212, keywords received from keyword extractor 206, query terms received from query log processor 232, and so forth.

Additionally, keyword analyzer 208 can employ different rules in determining whether to use keywords received from keyword extractor 206 and/or keywords from information regarding previous searches when identifying query terms. For example, when a user begins a Web browsing session and accesses a first page, there may be very little context information available so the keywords from information regarding previous searches can be weighted more heavily (or can even be used exclusively). Following this example, as the user navigates to different Web pages by selecting links displayed on the Web pages, more context information may become available so the keywords received from keyword extractor 206 are weighted more heavily than keywords from information regarding previous searches. The keywords received from keyword extractor 206 can optionally be weighted increasingly more heavily as more Web pages are accessed by selecting links. Such keywords from information regarding previous searches can optionally be weighted to zero, so that only the keywords received form keyword extractor 206 are used.

In one or more embodiments, keyword analyzer 208 also includes location information in one or more of the query terms. For example, a zip code for the user, a city name and/or state name for the user, and so forth can be included as part of the query term. This location information is added to one or more of the query terms forwarded to query term builder 210. Which query terms are to have this location information added can be identified in any of a variety of different manners. For example, the location information can be added to random query terms, to the most popular query terms (as identified by query log processor 232) that are forwarded to query term builder 210, to the least popular query terms (as identified by query log processor 232) that are forwarded to query term builder 210, using other processes or algorithms that select query terms to which location information is to be added, and so forth.

Query term builder 210 receives the query terms and generates a list of the query terms to be returned to UI display module 202. The query terms can be listed in accordance with any of a variety of different criteria, such as alphabetically, based on their popularity (as identified by query log processor 232), randomly, and so forth.

Additionally, query terms can be maintained and displayed as the user browses from one Web page to the next. For example, assume that UI display module 202 can display up to five different query terms. If only two query terms are generated when the user browses to the current Web page, then those two query terms are displayed by module 202. If four query terms are generated when the user browses to the next Web page, then those four query terms as well as one of the previous two query terms are displayed by module 202.

In one or more embodiments UI display module 202 and query term generation module 204 are implemented on a single device (e.g., computing device 102 of FIG. 1), while search engine 230 and query log processor 232 are implemented on other devices. Alternatively, system 200 can be implemented in other manners, such as search engine 230 and/or query log processor 232 being implemented on a same device as module 202 and/or module 204, or modules 202 and 204 being distributed across multiple computing devices.

Figure 6:
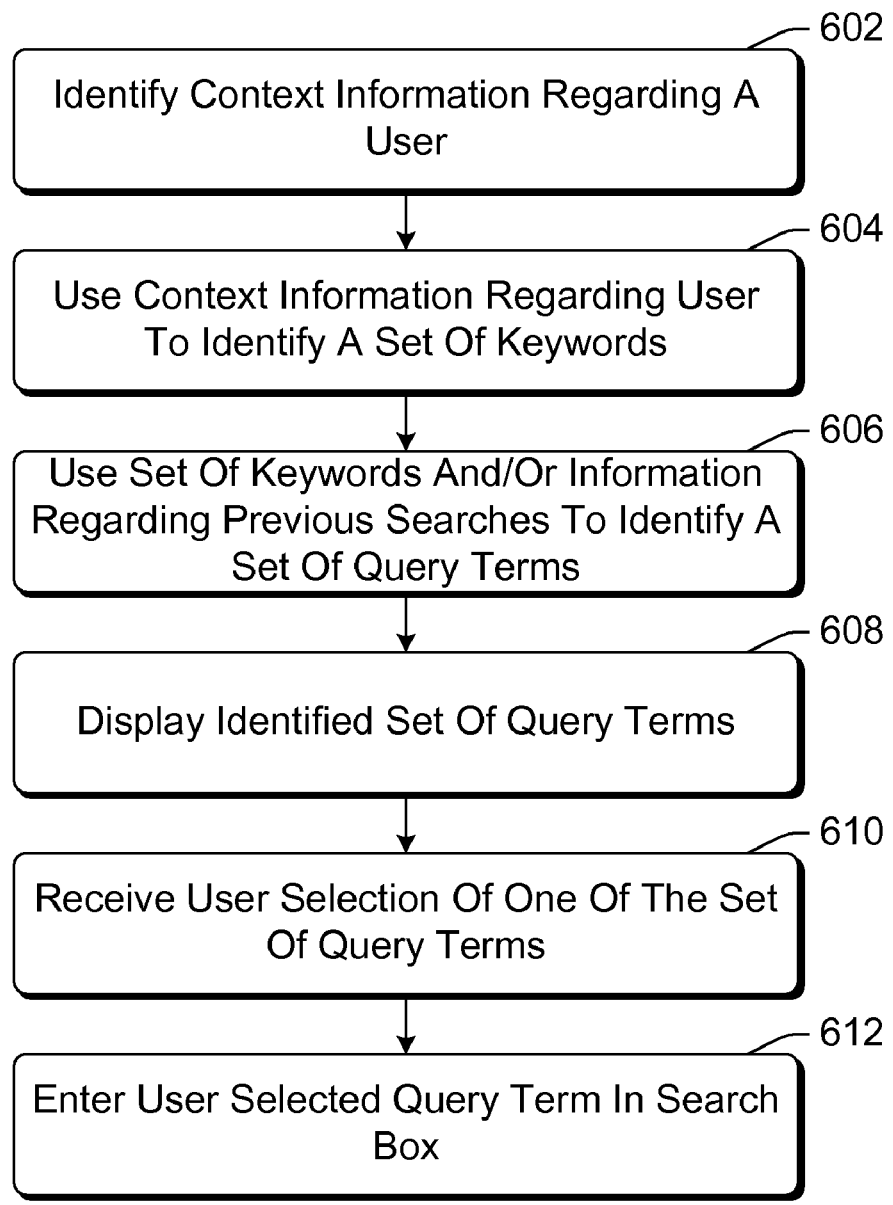
FIG. 6 is a flowchart illustrating an example process for combined web browsing and searching in accordance with one or more embodiments.

FIG. 6 is a flowchart illustrating an example process 600 for combined web browsing and searching in accordance with one or more embodiments. Process 600 is carried out by a system, such as system 200 of FIG. 2, and can be implemented in software, firmware, hardware, or combinations thereof. Process 600 is shown as a set of acts that specify operations performed by one or more systems or devices and are not necessarily limited to the order shown for performing the operations of the respective acts.

Initially, context information regarding a user is identified (act 602). As discussed above, a variety of different context information can be identified, such as a current location of the system implementing process 600, information regarding a Web page currently being displayed by the system implementing process 600, and so forth.

Context information regarding a user is used to identify a set of keywords (act 604). These keywords can be identified in a variety of different manners as discussed above (e.g., with respect to FIG. 2), and can be based at least in part on a current Web page being displayed and one or more previous Web pages displayed for the user.

The set of keywords and/or information regarding previous searches are used to identify a set of query terms (act 606). These query terms can be identified in any of a variety of different manners as discussed above (e.g., with respect to FIG. 2), and can optionally be based on previous searches by the user and/or previous popular searches by other users as discussed above. Alternatively, additional signals or information can be used to identify the set of query terms in other embodiments.

The set of query terms identified in act 606 are displayed (act 608). In one or more embodiments, the set of query terms are displayed in a drop-down menu corresponding to a search box, although the set of query terms can alternatively be displayed in other manners. A user selection of one of the set of query terms is received (act 610), and the selected query term is entered in the corresponding search box (act 612).

Figure 7:
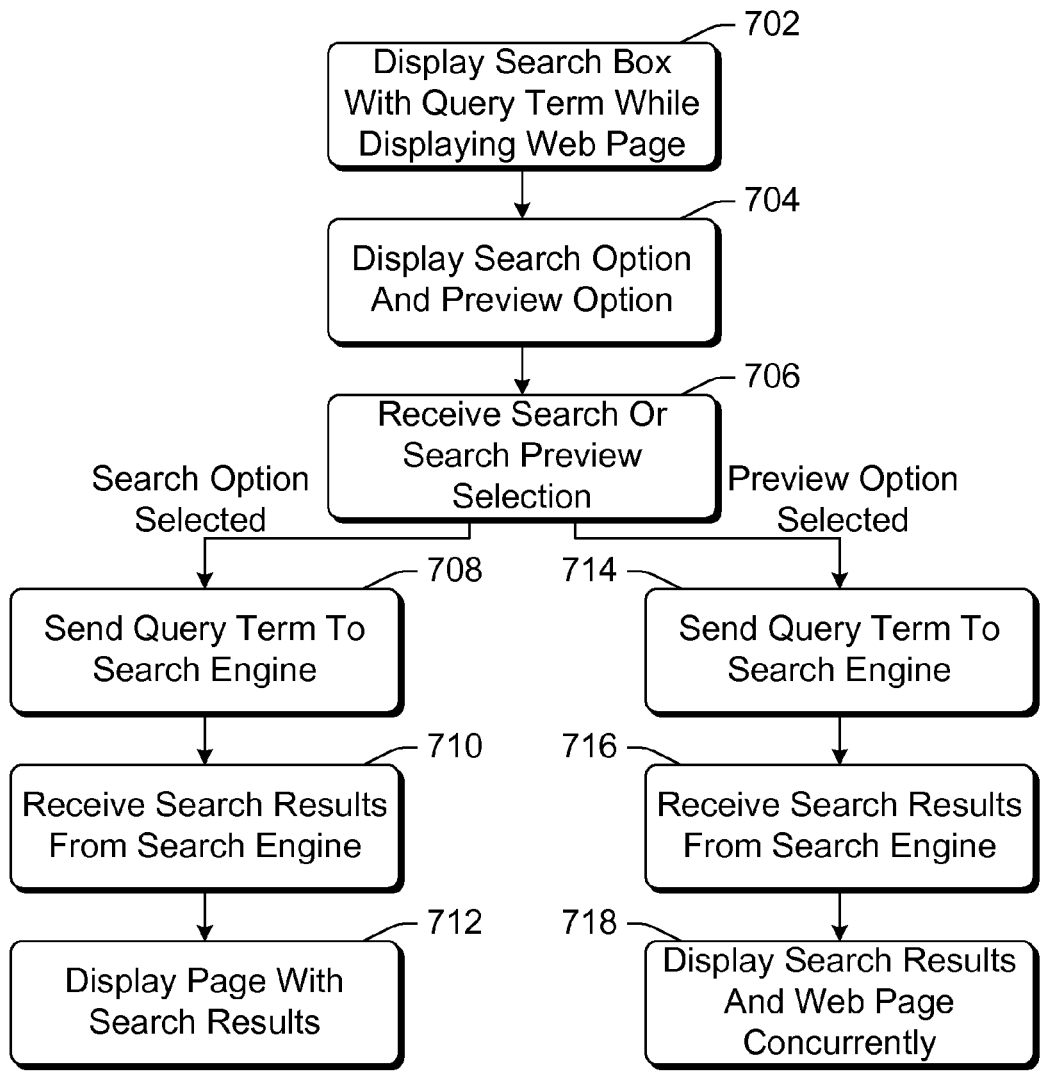
FIG. 7 is a flowchart illustrating an another example process for combined web browsing and searching in accordance with one or more embodiments.

FIG. 7 is a flowchart illustrating another example process 700 for combined web browsing and searching in accordance with one or more embodiments. Process 700 is carried out by a system, such as system 200 of FIG. 2, and can be implemented in software, firmware, hardware, or combinations thereof. Process 700 is shown as a set of acts that specify operations performed by one or more systems or devices and are not necessarily limited to the order shown for performing the operations of the respective acts.

Initially, a search box with a query term is displayed while displaying a Web page (act 702). A user can enter the query term manually or alternatively by selection of a query term (e.g., displayed in a drop-down menu) as discussed above. One or more search options and one or more search preview options are also displayed (act 704), and a user selection of a search option or a search preview option is received (act 706). Process 700 then proceeds based on whether selection of a search option or a search preview option is received.

The search option(s) can be a search Web site option and/or a search Web option. If a search option is selected, then the query term (displayed in the search box in act 702) is sent to a search engine (act 708). The search engine to which the query term is sent can vary and is based on, for example, user preferences, default settings for the Web browser displaying the Web page, whether the Web is to be searched or a Web site is to be searched, and so forth. Search results are received from the search engine (act 710) and a Web page including the search results is displayed (act 712).

The search preview options can be for a Web site and/or the Web. If the search preview option is selected, then the query term (displayed in the search box in act 702) is sent to a search engine (act 714). The search engine to which the query term is sent can vary and is based on, for example, user preferences, default settings for the Web browser displaying the Web page, whether the Web is to be searched or a Web site is to be searched, and so forth. Search results are received from the search engine (act 716) and both the search results and the Web page are displayed concurrently in a same window of a user interface (act 718).

Reference is made herein to displaying various information or data (e.g., displaying a set of query terms in act 608 of FIG. 6, displaying search results and a Web page concurrently in act 718, and so forth). This displaying refers to generating a signal that allows the particular information or data to be presented visually by a display device, with or without additional processing being performed by the display device. The device generating this signal can be the display device itself, or alternatively another device that provides this signal to the display device.

Figure 8:
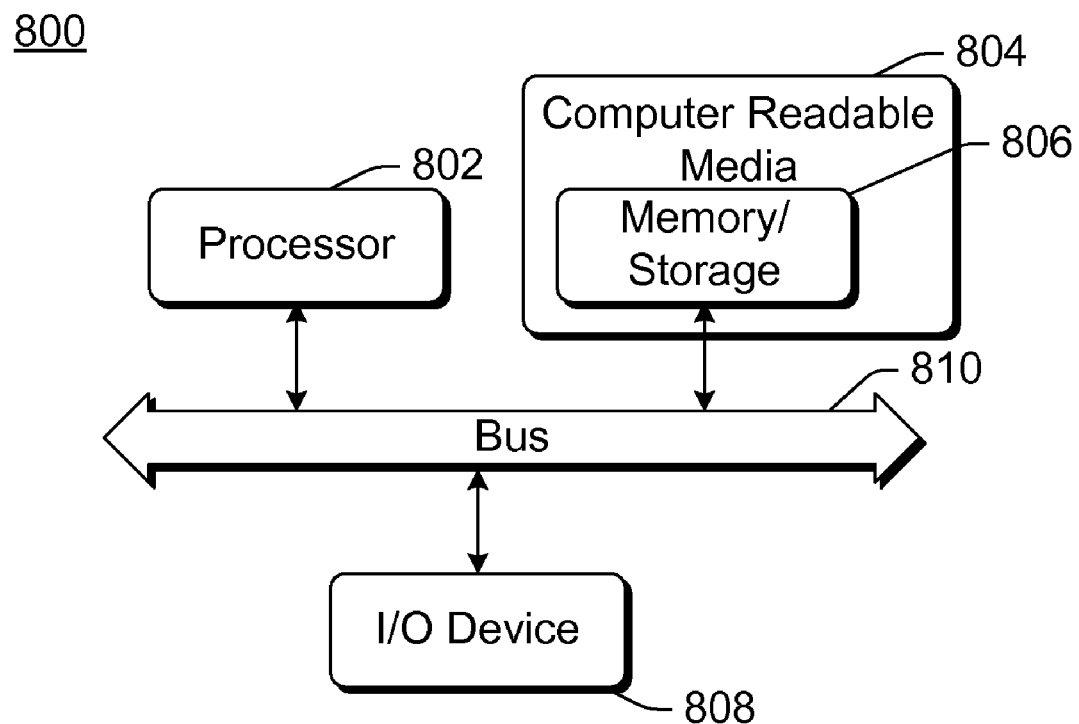
FIG. 8 illustrates an example computing device that can be configured to implement the combined web browsing and searching in accordance with one or more embodiments.

FIG. 8 illustrates an example computing device 800 that can be configured to implement the combined web browsing and searching in accordance with one or more embodiments. Computing device 800 can be, for example, computing device 102 of FIG. 1, a server 104 of FIG. 1, can implement UI display module 202 and/or query term generation module 204 of FIG. 2, and can implement any of the techniques discussed herein.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or I/O device(s) 808 can be included as part of, or alternatively may be coupled to, computing device 800. Bus 810 represents one or more of any of several types of bus structures, including a memory bus or memory controller, a peripheral bus, an accelerated graphics port, and a processor or local bus using any of a variety of bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the advertisement-controlled Web page customization techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
   in response to a Web page being browsed to or navigated to:
      identifying context information for a user of the device, the context information including information for at least one of the Web page browsed to or navigated to, previous Web pages accessed by the user, links selected by the user for Web page navigation, or a browsing pattern of the user;
      using the context information to identify a set of keywords based at least in part on a current Web page being displayed and one or more of the previous Web pages displayed for the user in a current Web browsing session, the context information being used to identify the set of keywords in response to a determination that the one or more previous Web pages are related to the current Web page being displayed; and
      using the set of keywords and at least one of previous searches by the user current popular searches by other users to identify a set of query terms; and
   displaying one or more query terms of the identified set of query terms as part of a user interface of the device; and
   displaying the current Web page concurrently with search results of a query based on the one or more query terms in the user interface of the device.

2. A method as recited in claim 1, the displaying comprising displaying the identified set of query terms in a drop-down menu, corresponding to a search box, displayed as part of the user interface of the device.

3. A method as recited in claim 1, further comprising:
   receiving a user selection of one of the set of query terms;
   displaying the selected one of the set of query terms in the search box; and
   sending the selected one of the set of query terms to a search engine in response to user selection of a search option.

4. A method as recited in claim 1, the context information comprising a current geographical location of the device.

5. A method as recited in claim 1, the information for the previous Web pages accessed by the user comprising keywords from the previous Web pages accessed by the user.

6. A method as recited in claim 1, the using the set of keywords to identify the set of query terms further comprising using an expansion method so that the set of query terms includes keywords in addition to the set of keywords.

7. A method as recited in claim 1, the using the set of keywords to identify the set of query terms further comprising using a category method to identify one or more general categories that the set of keywords are part of, and including the one or more general categories in the set of query terms.

8. A method as recited in claim 1, the using the set of keywords to identify the set of query terms further comprising using a sibling method to identify one or more query terms that share some but not all of the set of keywords, and including the one or more query terms in the set of query terms.

9. A method as recited in claim 1, the using the set of keywords to identify the set of query terms further comprising using an inference method to identify one or more query terms that are assumed to be desired by the user based on one or more other keywords entered by the user.

10. A method as recited in claim 1, the using the set of keywords to identify the set of query terms further comprising using an intersection method to identify common keywords among multiple Web pages accessed by the user, and including the common keywords in the set of query terms.

11. One or more computer-readable storage media devices comprising instructions that are executable and, responsive to executing the instructions, a computing device:
   navigates to a Web page being browsed or navigated to;
   identifies context information for a user of the computing device, the context information including information for at least one of the Web page browsed to or navigated to, previous Web pages accessed by the user, links selected by the user for Web page navigation, or a browsing pattern of the user;
   uses the context information to identify a set of keywords based at least in part on a current Web page being displayed and one or more of the previous Web pages H displayed for the user in a current Web browsing session, the context information being used to identify the set of keywords in response to a determination that the one or more previous Web pages are related to the current Web page being displayed;
   uses the set of keywords and at least one of previous searches by the user or current popular searches by other users to identify a set of query terms;
   displays one or more query terms of the identified set of query terms as part of a user interface of the computing device; and
   displays the current Web page concurrently with search results of a query based on the one or more query terms in the user interface of the computing device.

12. One or more computer-readable storage media devices as recited in claim 11, further comprising additional instructions that are executable and, responsive to executing the additional instructions, the computing device uses an expansion method so that the set of query terms includes keywords in addition to the set of keywords.

13. One or more computer-readable storage media devices as recited in claim 11, further comprising additional instructions that are executable and, responsive to executing the additional instructions, the computing device uses a category method to identify one or more general categories that the set of keywords are part of, and includes the one or more general categories in the set of query terms.

14. One or more computer-readable storage media devices as recited in claim 11, further comprising additional instructions that are executable and, responsive to executing the additional instructions, the computing device uses a sibling method to identify one or more of the query terms that share some but not all of the set of keywords, and includes the one or more query terms in the set of query terms.

15. One or more computer-readable storage media devices as recited in claim 11, further comprising additional instructions that are executable and, responsive to executing the additional instructions, the computing device uses an inference method to identify one or more of the query terms that are assumed to be desired by the user based on one or more other keywords entered by the user.

16. One or more computer-readable storage media devices as recited in claim 11, further comprising additional instructions that are executable and, responsive to executing the additional instructions, the computing device uses an intersection method to identify common keywords among multiple Web pages accessed by the user, and includes the common keywords in the set of query terms.

17. A computing device comprising:
   at least a memory and a processor to implement a query term generation module and, responsive to a Web page being browsed or navigated to, the query term generation module is configured to:
      identify context information for a user of the computing device, the context information including information for at least one of the Web page browsed to or navigated to, previous Web pages accessed by the user, links selected by the user for Web page navigation, or a browsing pattern of the user;
      use the context information to identify a set of keywords based at least in part on a current Web page being displayed and one or more of the previous Web pages displayed for the user in a current Web browsing session, the context information being used to identify the set of keywords in response to a determination that the one or more previous Web pages are related to the current Web page being displayed;
      use the set of keywords and at least one of previous searches by the user or current popular searches by other users to identify a set of query terms;
   a display device configured to:
      display one or more query terms of the identified set of query terms as part of a user interface; and
      display the current Web page concurrently with search results of a query based on the one or more query terms in the user interface.

18. A computing device as recited in claim 17, wherein the context information comprises a current geographical location of the computing device.

19. A computing device as recited in claim 17, wherein the information for the previous Web pages accessed by the user comprises prior keywords from the previous Web pages accessed by the user.

20. A computing device as recited in claim 17, wherein the query term generation module is further configured to use at least one of:
   an expansion method to include keywords in the set of query terms in addition to the set of keywords;
   a category method to identify one or more general categories that the set of keywords are part of;
   a sibling method to identify one or more of the query terms that share some but not all of the set of keywords;
   an inference method to identify one or more of the query terms that are assumed to be desired by the user based on one or more other keywords entered by the user; or
   an intersection method to identify common keywords among multiple Web pages accessed by the user.

* * * * *